JOHN STOCK & JACOB STOCK.
Improvement in Photographic-Cameras.
No. 126,498.  Patented May 7, 1872.
Fig. I.
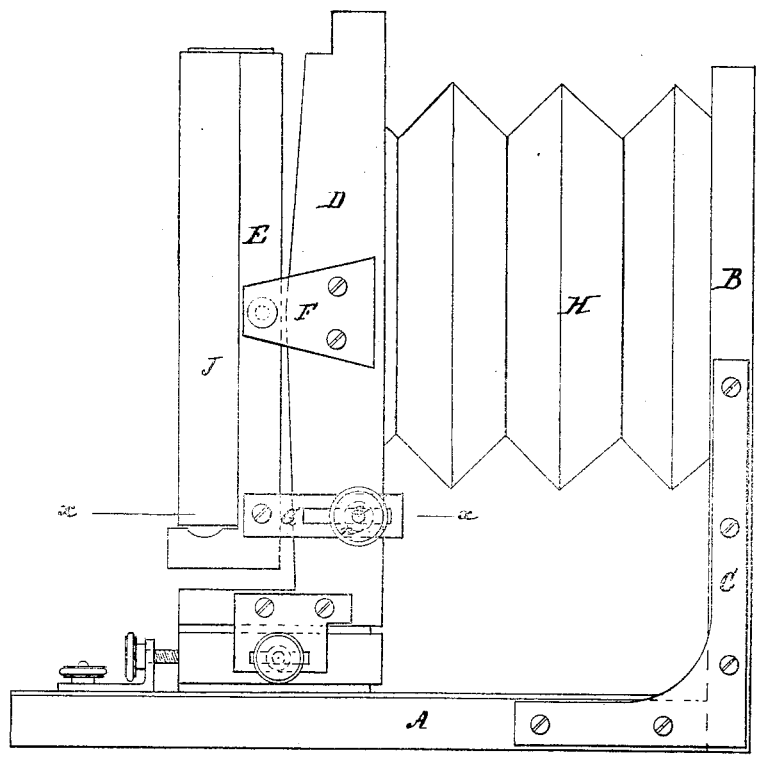
Fig. II.
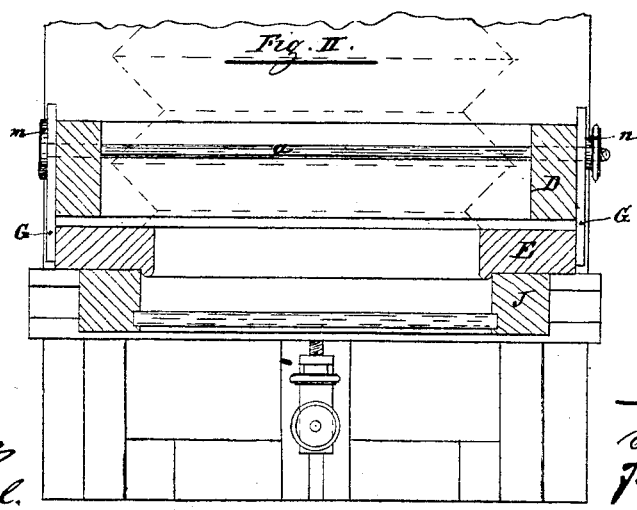
Witnesses.  Inventors.

126,498

UNITED STATES PATENT OFFICE.

JOHN STOCK AND JACOB STOCK, OF NEW YORK, N. Y.

IMPROVEMENT IN PHOTOGRAPHIC CAMERAS.

Specification forming part of Letters Patent No. 126,498, dated May 7, 1872.

*To all whom it may concern:*

Be it known that we, JOHN and JACOB STOCK, of New York, in the State of New York, have invented a new and useful Improvement in Photographic Cameras, of which the following is a specification:

The nature of our invention consists in the construction of the front of the camera, consisting only of a single plate securely fastened against the front of the bottom frame by means of suitable angle-pieces, in distinction from the usual arrangement of a box or part of a box, simplifying thereby the camera, and at the same time reducing the expense; and, further, in the arrangement of a bolt passing through the forward part of the camera, below the expanding part, from side to side, in such a manner that the fastening of the screw-head will fasten both sides of the movable part of the box in the desired position.

Figure I represents a side view of a camera embodying our invention. Fig. II is a horizontal section at the line $x\ x$, Fig. I.

A is the bottom frame, upon which the after part of the camera D, with the plate-holder frame E, is arranged and made to slide in the usual manner. To the forward part of this frame A a plate or board, B, is fastened, firmly secured by means of angle-pieces C attached on each side. This arrangement of a single board, B, secured by the angle-pieces C, obviates the necessity of the construction of a box, and consequently simplifies the same, at the same time reducing the expense of manufacture. The frame E, to which the plate-holder is attached, is hinged near its center to a frame, F, attached to the forward part D of the camera, and has at its lower end a frame, G, attached on each side, provided with a slot to allow said frame E to swing on the frame F and be fastened in any desired position. The manner of fastening is usually done by bolts fast in each side of the camera-box D, and tightening the same first on one side and then at the other side. By this arrangement there is great liability of changing or disturbing the already fixed position of said frame E. To obviate this difficulty, and at the same time to simplify this arrangement, we arrange a bolt, *a*, which passes through both sides of the frame or box D, and through both the frames G situated on each side, said bolt *a* being provided on one end with a large head, *m*, and at the other end with a large nut-head, *n*, so that, by loosening or tightening said nut-head *n* the frames G will, by one and the same operation, be either loosened or fastened to the side of the box D, which said operation may be performed while the operator has his other hand upon the frame E, to regulate the desired position.

What we claim as our invention, and desire to secure by Letters Patent, is—

1. The arrangement of a single board, B, against the front of the frames A of a camera, in combination with angle-pieces C, substantially as and for the purpose herein described.

2. We claim the bolt *a*, with a large head, *m*, and screw-head *n*, in combination with the frames G in the forward box D of a camera, substantially as and for the purpose set forth.

JOHN STOCK.
JACOB STOCK.

Witnesses:
HENRY E. ROEDER,
A. C. CRONDAL.